United States Patent
Wang et al.

(10) Patent No.: US 10,420,149 B2
(45) Date of Patent: Sep. 17, 2019

(54) METHOD AND APPARATUS FOR RANDOM ACCESS PREAMBLE DETECTION

(71) Applicant: Telefonaktiebolaget LM Ericsson (publ), Stockholm (SE)

(72) Inventors: Jianfeng Wang, Beijing (CN); Henrik Sahlin, Mölnlycke (SE); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 217 days.

(21) Appl. No.: 15/542,769

(22) PCT Filed: Feb. 6, 2015

(86) PCT No.: PCT/CN2015/072390
§ 371 (c)(1),
(2) Date: Jul. 11, 2017

(87) PCT Pub. No.: WO2016/123790
PCT Pub. Date: Aug. 11, 2016

(65) Prior Publication Data
US 2017/0359839 A1   Dec. 14, 2017

(51) Int. Cl.
*H04W 4/00* (2018.01)
*H04W 74/08* (2009.01)
(Continued)

(52) U.S. Cl.
CPC ......... *H04W 74/0833* (2013.01); *H04J 13/00* (2013.01); *H04L 1/0029* (2013.01); *H04J 11/00* (2013.01)

(58) Field of Classification Search
None
See application file for complete search history.

(56) References Cited

U.S. PATENT DOCUMENTS

| 8,831,150 B1 | 9/2014 | Xu et al. |
| 2009/0213968 A1 | 8/2009 | Tormalehto |

(Continued)

FOREIGN PATENT DOCUMENTS

| CN | 101022674 A | 8/2007 |
| CN | 102315908 A | 1/2012 |

(Continued)

OTHER PUBLICATIONS

Author Unknown, "Technical Specification Group Radio Access Network; Evolved Universal Terrestrial Radio Access (E-UTRA); Physical channels and modulation (Release 12)," Technical Specification 36.211, Version 12.4.0, 3GPP Organizational Partners, Dec. 2014, 124 pages.

(Continued)

*Primary Examiner* — Zewdu A Beyen
(74) *Attorney, Agent, or Firm* — Sage Patent Group

(57) ABSTRACT

Embodiments of the present disclosure provide a method in a base station for random access preamble detection. The method comprises determining a frequency offset of a received uplink signal and adjusting the received uplink signal with the determined frequency offset. The method also comprises detecting, from the adjusted uplink signal, whether there is a random access preamble with a first false alarm value. Additionally, the method may further comprise detecting from the received uplink signal, whether there is a random access preamble with a second false alarm value, before determining the frequency offset of the received uplink signal. Determining the frequency offset of the received uplink signal may be performed in response that a random access preamble is detected with the second false alarm value, the second false alarm value being higher than the first false alarm value.

19 Claims, 7 Drawing Sheets

(51) Int. Cl.
*H04J 13/00* (2011.01)
*H04L 1/00* (2006.01)
*H04J 11/00* (2006.01)

(56) References Cited

U.S. PATENT DOCUMENTS

2010/0054235 A1* 3/2010 Kwon ................. H04J 13/16
370/350
2010/0015805 A1 6/2010 Yang
2010/0246528 A1* 9/2010 Huang ................. H04L 5/0007
370/330
2017/0006637 A1 1/2017 Sahlin et al.

FOREIGN PATENT DOCUMENTS

| CN | 103716896 A | 4/2014 |
|---|---|---|
| EP | 1274193 A1 | 1/2003 |
| EP | 1944935 A2 | 7/2008 |

OTHER PUBLICATIONS

Author Unknown, "Technical Specification Group Radio Access Network; Evolved Universal Terrestrial Radio Access (E-UTRA); Medium Access Control (MAC) protocol specification (Release 12)," Technical Specification 36.321, Version 12.4.0, 3GPP Organizational Partners, Dec. 2014, 60 pages.
International Search Report and Written Opinion for International Patent Application No_ PCT/CN2015/072390, mailed Sep. 14, 2015, 8 pages.
Extended European Search Report for European Patent Application No. 15880746.1, dated Aug. 14, 2018, 8 pages.

* cited by examiner

METHOD AND APPARATUS FOR RANDOM ACCESS PREAMBLE DETECTION

This application is a 35 U.S.C. § 371 national phase filing of International Application No. PCT/CN2015/072390, filed Feb. 6, 2015, the disclosure of which is incorporated herein by reference in its entirety.

TECHNICAL FIELD

The non-limiting and exemplary embodiments of the present disclosure generally relate to the technical field of radio communications, and specifically to a method, an apparatus and a computer program for random access preamble detection and a base station using the same.

BACKGROUND

This section introduces aspects that may facilitate better understanding of the present disclosure. Accordingly, the statements of this section are to be read in this light and are not to be understood as admissions about what is in the prior art or what is not in the prior art.

In a typical cellular radio system, end-user radio terminals, also known as user terminals, mobile stations or user equipment, UE, are arranged to communicate via a radio access network (RAN) to one or more core networks. The RAN covers a geographical area which is divided into cells each being served by a base station, which may be referred to as NodeB, evolved NodeB (eNodeB), or eNB, depending on protocols and technologies.

One of the most basic requirements for any cellular radio system is the possibility for a UE to initiate a connection request, commonly referred to as random access. In 3GPP LTE (3rd Generation Partnership Project Long Term Evolution), as specified in 3GPP TS (Technical Specification) 36.211 v12.4.0, the random access procedure comes in two forms, allowing access to be either contention-based or contention-free. The contention-based procedure consists of four-steps, as specified in 3GPP TS 36.321 v12.4.0, including: Step 1, Preamble transmission; Step 2, Random access response; Step 3, Layer 2/Layer 3 message transmission; and Step 4, Contention resolution message. The contention-free random access procedure is typically used in handover between cells.

In 3GPP LTE, the preamble sequences in Step 1 are generated from one or several root Zadoff-Chu (ZC) sequences, as specified in 3GPP TS 36.211 v12.4.0. Basically there are a number of available sequences for a UE to select for conducting the random access in one cell. For example, in an LTE system, there are 64 sequences in each cell that can be used for random access. Each time when a UE is about to conduct the random access, one sequence out of the 64 sequences is selected. A collision may occur if several UEs are selecting the same sequence which could result in a random access failure for some or all UEs.

According to the contention-based procedure, a UE may initiate random access by transmitting a random access preamble to a base station, e.g. eNB in LTE, via a Physical Random Access Channel (PRACH). This preamble may also be referred to as a PRACH preamble hereafter.

Once the preamble is detected by the eNB in a time-frequency slot, the eNB would send a Random Access Response (RAR) on a Physical Downlink Shared Channel (PDSCH) in Step 2, and address it with a Random Access Radio Network Temporary Identifier (RA-RNTI), which conveys the identity of the detected preamble, a timing alignment instruction to synchronize subsequent uplink transmissions from the UE, an initial uplink resource grant for transmission of the Step 3 message, and an assignment of a temporary Cell Radio Network Temporary Identifier (C-RNTI). Then in Step 3, the UE would convey an actual random access procedure message, such as a Radio Resource Control (RRC) connection request, tracking area update, or scheduling request to the eNB. Finally, in Step 4, a contention resolution message will be sent by the eNB.

With further development of radio communications, much higher carrier frequencies and more antenna elements are adopted. In order to construct a random access preamble which is robust against phase noise and a frequency error or offset for the high carrier frequency and reduce hardware complexity with multiple antennas, a new random-access preamble format has been proposed in some discussions for the next generation communications system, e.g. 5G system including millimeter wave (mmW) networks, and concept development, e.g. in a PCT application PCT/EP2014/055898. The proposed preamble sequence is constructed by repeating a short sequence multiple times, the length of each short sequence equal to that of a symbol, e.g. a Single Carrier Frequency Division Multiple Access (SC-FDMA) symbol transmitted in uplink for carrying user data, and thus a preamble detector at the base station may reuse existing Fast Fourier Transforming (FFT) modules configured for other uplink channels, e.g. a Physical Uplink Shared Channel (PUSCH), and signals as shown in FIG. 1, which schematically illustrates an existing procedure for random access preamble detection in the prior art. In this way, the amount of dedicated random-access related processing and hardware support is significantly reduced for multi-antenna systems, and the detector is also robust against inter-carrier interference from other uplink channels and signals.

As illustrated in FIG. 1, the received signal comprises a preamble sequence of 14 repeating short sequences, each corresponding to a symbol for carrying user data. 12 FFT modules at the detector may be used for converting corresponding short sequences into the frequency domain before the following matched filters (MFs). Then coherent accumulation of all outputs of the MFs is applied before inverse FFT (IFFT) processing. Finally, based on absolute square values of the IFFT outputs, the preamble may be detected together along with round trip time estimation.

Since one of the main design targets for the next generation communications systems is to work on the high frequency spectrum, such as 15 GHz or even higher, hardware impairments, such as phase noise, would become much more significant than in the current systems working on the low frequency spectrum. For example, assuming the phase noise from the hardware in a UE introduces a frequency error of 0.1 ppm (part per million), there would be 1.5 kHz frequency error or offset on the 15 GHz carrier frequency. A Doppler shift may further increase this frequency error or offset when the UE is moving. Thus, a phase rotation of the received PRACH preamble over the preamble length, for example the total length of 14 short sequences in FIG. 1, increases with the increasing frequency error or offset, which results in a restriction on the coherent accumulation time of the detector at the base station. This phase rotation in combination with the coherent accumulation results in a high access failure rate, i.e. low receiving sensitivity. It is well known that the low PRACH receiving sensitivity will limit the system coverage, and thus degrade the system performance.

SUMMARY

Various embodiments of the present disclosure aim at providing a method and apparatus for random access preamble detection with increased receiving sensitivity and decreased hardware complexity. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method in a base station for random access preamble detection. The method comprises determining a frequency offset of a received uplink signal and adjusting the received uplink signal with the determined frequency offset. The method also comprises detecting, from the adjusted uplink signal, whether there is a random access preamble with a first false alarm value.

By means of this method, the effect of a high frequency offset caused in a radio system working on the high frequency spectrum may be alleviated or eliminated and thus may not result in a high access failure rate. Accordingly, the receiving sensitivity may be increased, thereby increasing the system coverage and improving the system performance.

Additionally, the method may further comprise detecting from the received uplink signal, whether there is a random access preamble with a second false alarm value, before determining the frequency offset of the received uplink signal. Determining the frequency offset of the received uplink signal may be performed in response that a random access preamble is detected with the second false alarm value, the second false alarm value being higher than the first false alarm value.

With two levels of false alarm values, the detection success rate and receiving sensitivity may further be increased. Furthermore, since the frequency offset determination, the uplink signal adjustment and the fine preamble detection with the lower false alarm value are all performed after the coarse preamble detection with a higher false alarm value, i.e. the second false alarm value, if no preamble is coarsely detected, these operations may not be performed, which may additionally reduce the processing complexity and power consumption at the base station.

In an embodiment, the random access preamble may comprise at least a sequence of a plurality of identical random access sequences. The method may further comprise partitioning the received uplink signal into a plurality of segments each having time duration equal to the time duration of the random access sequence, before determining the frequency offset of the received uplink signal.

By partitioning the received uplink signal into multiple short segments, the existing processing modules, such as FFT modules, designed for other uplink channels or signals at the base station may be reused for processing the short segments and thus no hardware dedicated for detecting preambles is needed, thereby reducing the hardware complexity of the base station.

In a further embodiment, the frequency offset of the received uplink signal may be determined from a phase rotation for at least one pair of segments among the plurality of segments.

In another embodiment, the received uplink signal may be adjusted by compensating for the determined frequency offset for each of the plurality of segments to obtain a plurality of offset-compensated segments.

In yet another embodiment, the existence or non-existence of a random access preamble may be determined with the first false alarm value by converting the plurality of offset-compensated segments into frequency domain; filtering the converted plurality of offset-compensated segments in the frequency domain; coherently accumulating the filtered plurality of offset-compensated segments to an accumulated signal sequence; converting the accumulated signal sequence back to time domain; and detecting whether there is a random access preamble from the converted accumulated signal sequence with the first false alarm value.

In yet another embodiment, the accumulated signal sequence may comprise a plurality of signal elements. The existence or non-existence of a random access preamble may be detected from the accumulated signal sequence with the first false alarm value by obtaining an energy level for each of the plurality of signal elements; calculating a ratio of the energy level over a noise level of the received uplink signal; and then detecting the random access preamble based on a comparison of the ratio with a threshold determined from the first false alarm value.

In yet another embodiment, partitioning the received uplink signal may be performed before detecting whether there is a random access preamble with the second false alarm value. The existence or non-existence of a random access preamble may be detected with the second false alarm value by converting the plurality of segments from time domain to frequency domain; filtering the converted plurality of segments in the frequency domain; converting the filtered plurality of segments back to the time domain; non-coherently accumulating the converted filtered plurality of segments to an accumulated signal sequence; and then detecting whether there is a random access preamble based on a comparison of the accumulated signal sequence with a threshold determined from the second false alarm value.

In yet another embodiment, the coherently accumulated signal sequence may be expressed as a vector $G_{N_{cs}}$ comprising a plurality of vector elements $g_{m,Ncs}(n)$ each representing a corresponding signal element of the coherently accumulated signal sequence:

$$G_{N_{cs}}=[g_{Ncs}(0),g_{Ncs}(1)\ldots,g_{Ncs}(N_{ZC}-1)], \text{ wherein}$$

$$g_{Ncs}(n)=\Sigma_{m=0}^{M-1}g_{m,Ncs}(n), n=0,1,\ldots N_{ZC}-1,$$

where $N_{ZC}$ denotes a number of the plurality of signal elements; M denotes a number of the plurality segments; m denotes an index of the plurality segments; and $g_{m,Ncs}(n)$ denotes the $m^{th}$ segment of the $n^{th}$ signal element with a cyclic shift being applied to the random access sequence.

In yet another embodiment, the non-coherently accumulated signal sequence may comprise a plurality of signal elements and be expressed as a vector $Z_{N_{cs}}$ comprising a plurality of vector elements $Z_{N_{cs}}(n)$ each representing a corresponding signal element of the non-coherently accumulated signal sequence:

$$Z_{N_{cs}}=[z_{N_{cs}}(0),\ldots,z_{N_{cs}}(N_{ZC}-1)], \text{ wherein}$$

$$z_{N_{cs}}(n)=\Sigma_{m=0}^{M-1}|q_{m,N_{cs}}(n)|^2, n=0,1,\ldots N_{ZC}-1,$$

where $N_{ZC}$ denotes a number of the plurality of signal elements of the non-coherently accumulated signal sequence; M denotes a number of the plurality segments; m denotes an index of the plurality segments; and $q_{m,N_{cs}}(n)$ denotes the $m^{th}$ segment of the $n^{th}$ signal element of the non-coherently accumulated signal sequence with a cyclic shift being applied to the random access sequence.

In yet another embodiment, the random access sequence may be defined by means of a Zadoff-Chu sequence, where $u^{th}$ root Zadoff-Chu sequence is defined as $$x_u(n) = e^{-j\frac{\pi u n(n+1)}{N_{ZC}}},$$
$$n = 0, 1, \ldots N_{ZC} - 1$$

wherein u is an index of the root sequence; $N_{ZC}$ denotes a length of the Zadoff-Chu sequence, which is a prime number; and the random access sequence is defined by $$s_{short}(t) = \beta \sum_{k=0}^{N_{ZC}-1} \sum_{n=0}^{N_{ZC}-1} x_u(n) \cdot e^{-j\frac{2\pi n k}{N_{ZC}}} \cdot e^{j 2\pi(k+k_0)\Delta f t},$$

wherein $0 \le t < T_{short}$, $T_{short}$ being the time duration of the random access sequence; $\beta$ is an amplitude-scaling factor, $k_0 = n_{PRB}^{RA} N_{sc}^{RB} - N_{RB}^{UL} N_{sc}^{RB}/2$, and $\Delta f$ is subcarrier spacing, where a location of the resource block used for the random access preamble in the frequency domain is controlled by a parameter $n_{PRB}^{RA}$; a size of the resource block in the frequency domain, expressed as a number of subcarriers, is denoted by $N_{sc}^{RB}$, and an uplink bandwidth configuration, expressed in multiples of $N_{sc}^{RB}$, is denoted by $N_{RB}^{UL}$.

In a second aspect of the present disclosure, there is provided an apparatus in a base station for random access preamble detection. The apparatus comprises a determining module configured to determine a frequency offset of a received uplink signal and an adjusting module configured to adjust the received uplink signal with the determined frequency offset. The apparatus also comprises a first detecting module configured to detect, from the adjusted uplink signal, whether there is a random access preamble with a first false alarm value.

Additionally, the apparatus may further comprise a second detecting module configured to detect, from the received uplink signal, whether there is a random access preamble with a second false alarm value, before the determining module determines the frequency offset of the received uplink signal, which is performed in response that a random access preamble is detected by the second detecting module with the second false alarm value, the second false alarm value being higher than the first false alarm value.

In a third aspect of the present disclosure, there is provided a base station in a radio access network. The base station comprises a processor and a memory. The memory contains instructions executable by the processor, whereby the base station is operative to perform the method according to the first aspect of the present disclosure.

In a fourth aspect of the present disclosure, there is provided a base station in a radio access network. The base station comprises processing means adapted to perform the method according to the first aspect of the present disclosure.

In a fifth aspect of the present disclosure, there is provided a computer program. The computer program comprises instructions which, when executed on at least one processor, cause the at least one processor to carry out the method according to the first aspect of the present disclosure.

According to the various aspects and embodiments as mentioned above, the proposed method can well resist the frequency offset in a system working on the high carrier frequency and also can reduce the hardware requirements on both base station side and UE side. Particularly, the following advantages may be identified: the random access failure rate can be obviously decreased in the case of high frequency offset; the hardware requirements, such as on a Local Oscillator (LO), in both base stations and user terminals can be relaxed in some degree; and the system performance, such as the coverage, can be improved at least for initial access and handover.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
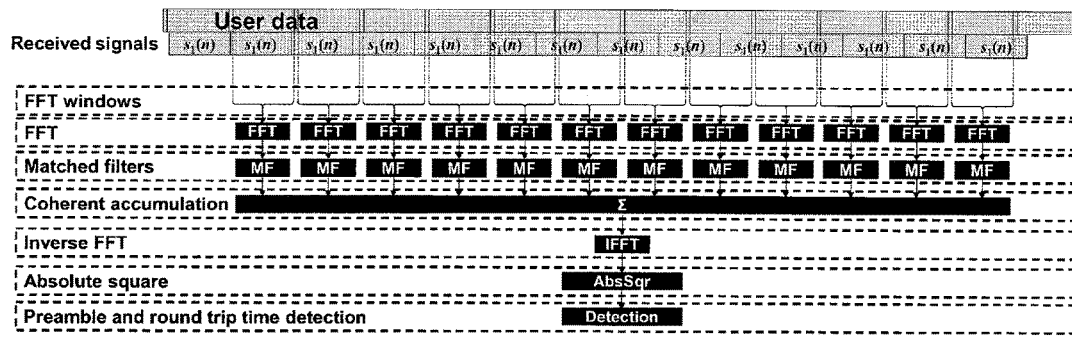
FIG. 1 schematically illustrates an existing procedure for random access preamble detection in the prior art.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "another embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of embodiments. As used herein, the singular forms "a", "an" and "the" are intended to include the plural forms as well, unless the context clearly indicates otherwise. It will be further understood that the terms "comprises", "comprising", "contains", "containing", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "base station" used herein may refer to an entity or node capable of providing radio communications services to user terminals that may be referred to as "user equipment" or "UE" herein.

In order to clearly describe the proposed method according to embodiments of the present disclosure, some concepts in 3GPP LTE and an existing procedure for generating random access preambles are firstly introduced.

In 3GPP LTE, the downlink from a base station to a UE is based on Orthogonal Frequency Division Multiplexing (OFDM), while the uplink from the UE to the base station is based on Discrete-Fourier-Transform-spread (DFT-spread) OFDM, also known as Single Carrier Frequency Division Multiple Access (SC-FDMA).

Typically, a transmitted signal in a radio communications system is organized in some form of frame structure. In LTE, a radio frame having ten sub-frames of a time length 1 millisecond is utilized, with each sub-frame being divided into two slots according to 3GPP TS 36.211 v12.4.0. The transmitted signal in each slot is described by one or several resource grids of $N_{RB}^{UL} N_{sc}^{RB}$ subcarriers and $N_{symb}^{UL}$ SC-FDMA symbols. The resource grid comprises $N_{RB}^{UL}$ physical resource blocks, each being defined as $N_{symb}^{UL}$ consecutive SC-FDMA symbols in the time domain and $N_{sc}^{RB}$ consecutive subcarriers in the frequency domain.

A sub-frame of 1 millisecond is made up of 14 OFDM symbols in downlink and 14 SC-FDMA symbols in uplink, given a cyclic prefix of normal length. A cyclic prefix is attached to each of the 14 OFDM symbols. Portions of the OFDM and SC-FDMA symbols are used to carry user data in physical channels referred to as the Physical Downlink Shared Channel (PDSCH) and PUSCH, respectively. The PRACH may be transmitted over one or several sub-frames, which are referred to as PRACH sub-frame(s) hereafter.

In the existing procedure for generating random access preambles, a root preamble sequence is firstly selected by a UE from one or several root Zadoff-Chu sequences, which is expressed as $$X_u = [x_u(0), x_u(1), \ldots, x_u(N_{ZC}-1)], \quad (1)$$

where u is the root sequence index; $X_u$ denotes the $u^{th}$ root Zadoff-Chu sequence; $N_{ZC}$ denotes the length of the Zadoff-Chu sequence, e.g. as defined in 3GPP TS 36.211 v12.4.0, and $$x_u(n) = e^{-j\frac{\pi u n(n+1)}{N_{ZC}}}, \quad (2)$$

$$n = 0, 1, \ldots N_{ZC} - 1,$$

where n is the index of elements in vector $X_u$.

Then a cyclic shift is selected by the UE as $N_{cs}$, and thus the sequence shifted by the cyclic shift $N_{cs}$ is expressed as $$X_{u,N_{cs}} = [x_u(N_{cs}), x_u(N_{cs}+1), \quad \ldots \quad x_u(N_{ZC}-1), x_u(0) \ldots, x_u(N_{cs}-1)], \quad (3)$$

where $N_{cs}$ denotes the cyclic shift selected for the random access preamble generation.

Subsequently, the sequence shifted by the cyclic shift $N_{cs}$ is converted to the frequency domain with an $N_{ZC}$-point Discrete Fourier Transform (DFT) as $$V_{N_{cs}} = DFT(X_{u,N_{cs}}) = [v_{N_{cs}}(0), \ldots, v_{N_{cs}}(N_{ZC}-1)], \quad (4)$$

which will be mapped to physical resource blocks in the frequency domain.

Accordingly, a time-continuous short signal sequence can be formulated as $$s_{short}(t) = \beta \sum_{k=0}^{N_{ZC}-1} V_{N_{CS}}(k) \cdot e^{j2\pi(k+k_0)\Delta f t}, \quad (5)$$

where $0 \leq t < T_{short}$. $T_{short}$ being the time duration of the short signal; β is an amplitude scaling factor in order to confirm to the transmit power of the preamble to be transmitted; Δf is subcarrier spacing and $k_0$ is used to control the position of the preamble in the frequency domain. The subcarrier spacing denotes spacing between the subcarriers.

Alternatively, equation (5) may be expressed as $$s_{short}(t) = \beta \sum_{k=0}^{N_{ZC}-1} \sum_{n=0}^{N_{ZC}-1} x_u(n) \cdot e^{-j\frac{2\pi n k}{N_{ZC}}} \cdot e^{j2\pi(k+k_0)\Delta f t}, \quad (5')$$

wherein $0 \leq t < T_{short}$, $T_{short}$ being the time duration of the signal; β is an amplitude-scaling factor in order to confirm to the transmit power of the preamble to be transmitted, $k_0 = n_{PRB}^{RA} N_{sc}^{RB} - N_{RB}^{UL} N_{sc}^{RB}/2$, and Δf is the subcarrier spacing, where a location of the resource block used for the preamble in the frequency domain is controlled by the parameter $n_{PRB}^{RA}$; a size of the resource block in the frequency domain, expressed as a number of subcarriers, is denoted by $N_{sc}^{RB}$, and an uplink bandwidth configuration, expressed in multiples of $N_{sc}^{RB}$, is denoted by $N_{RB}^{UL}$.

A short sequence of the same time duration as the OFDM symbol may be achieved by $T_{short} = 1/\Delta f$. For LTE release 8, the subcarrier spacing equals Δf=15 kHZ as defined in Table 6.2.3-1 in 3GPP 36.211 v12.4.0 such that the time duration of the short sequence $T_{short}$ equals 66.6 μs. With a change in the subcarrier spacing to, e.g., Δf=7.5 kHZ, then the time duration of the short sequence $T_{short}$ equals 133.2 μs.

In a PRACH sub-frame, the preamble to be transmitted is constructed by repeating the short sequence in (5) or (5') and expressed as $$s(t)=s_{short}((t-T_{cp}) \mod(T_{short})), \quad (6)$$

where $0 \leq t < T_{seq}$, $T_{seq}$ is the total time duration of the constructed preamble; $T_{cp}$ is an optional parameter for designing start of the first short sequence, which can be zero in default; and "mod" represents a mod operation, i.e. a function that returns the remainder of division.

Figure 2:
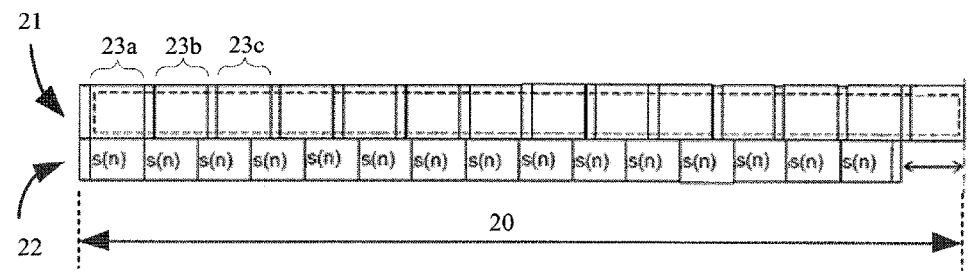
FIG. 2 illustrates an example PRACH format which may be used in embodiments of the present disclosure.

FIG. 2 illustrates an example PRACH format which may be used in embodiments of the present disclosure. As shown in FIG. 2, one PRACH sub-frame 20 comprises a PUSCH 21 and a preamble 22 generated for each UE. The preamble 22 is designed such that it comprises a sequence of a plurality of identical random access sequences, for example 15 identical random access sequences s(n), where each random access sequence s(n) has the same length in time as each SC-FDMA symbol 23a, 23b, 23c (only a few indicated in FIG. 2). Alternatively, the preamble 22 may comprise two or more sequences with different repeating random access sequences.

In the following, a method for random access preamble detection according to embodiments of the present disclosure will be described in detail with reference to FIGS. 3-6.

Figure 3:
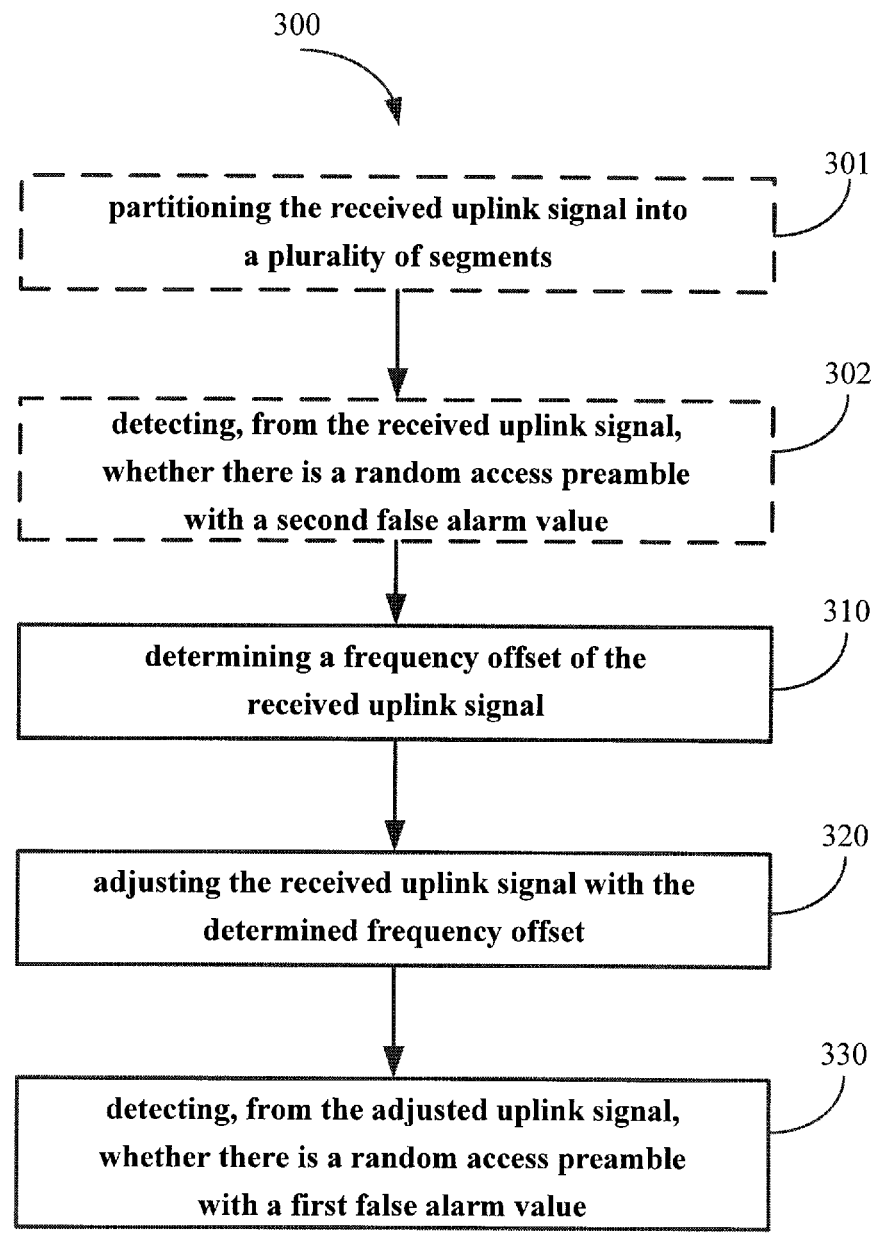
FIG. 3 illustrates a flowchart of an example method 300 for random access preamble detection according to embodiments of the present disclosure.

FIG. 3 illustrates a flowchart of an example method 300 in a base station for random access preamble detection according to embodiments of the present disclosure.

In an embodiment, when an uplink signal y(t), which is transmitted from a UE to the base station, is received on a PRACH subframe by a receiver at the base station, the received uplink signal may be firstly partitioned into a plurality of segments in block 301, e.g. M segments, preferably each having time duration equal to that of the random access sequence, e.g. $T_{short}$, where the total duration of the M segments is equal to or less than the total duration of the constructed preamble, i.e. $M \times T_{short} \leq T_{seq}$.

The M segments are represented by M signal vectors. The $m^{th}$ signal vector after the partition is represented as $y_m(t)$ with time duration of $T_{short}$, which is sampled with a sample rate of $T_s = T_{short}/N_{ZC}$ to obtain $N_{ZC}$ samples and expressed as, $$Y_m = [y_m(0), y_m(1), \ldots, y_m(N_{ZC}-1)], m=0,1,\ldots,M, \quad (7)$$

where $N_{ZC}$ denotes the length of the $m^{th}$ signal vector. The $n^{th}$ ($n=0, 1, \ldots, N_{ZC}-1$) sample may be referred to as the $n^{th}$ signal element of the $m^{th}$ segment.

Then, in an embodiment, whether there is a random access preamble in the received uplink signal may be detected with a predetermined high false alarm value $P_{FA,2}$, corresponding to a second false alarm value in block 302.

Figure 4:
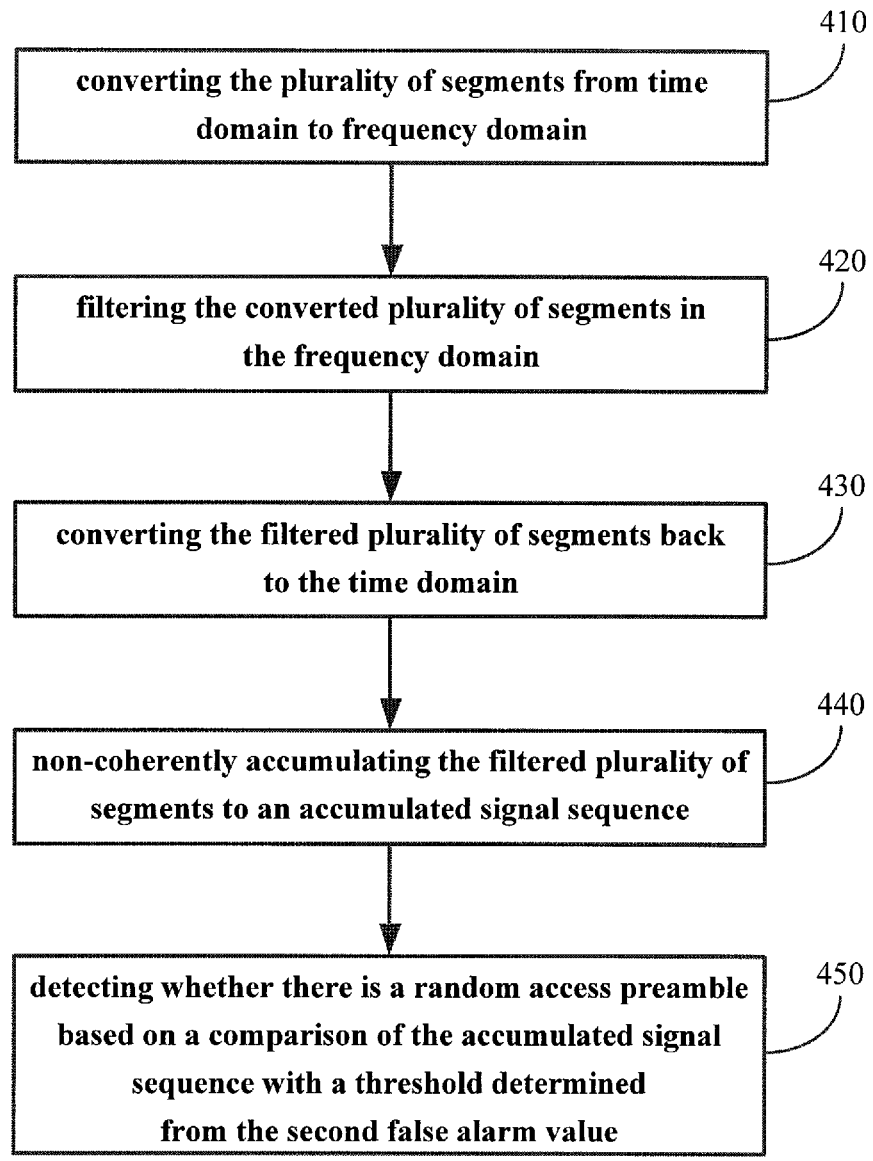
FIG. 4 illustrates an example procedure for implementing the random access detection with the high false alarm value as illustrated in FIG. 3 according to an embodiment of the present disclosure.

FIG. 4 illustrates an example procedure for implementing the random access detection with the high false alarm value $P_{FA,2}$. In this embodiment, the plurality of segments may be firstly converted from time domain to frequency domain, e.g. via FFT processing in block 410.

For example, the M signal vectors representing the M segments in equation (7) may be fed into M FFT modules of the receiver at the base station to obtain samples in the frequency domain. The $m^{th}$ vector after FFT and subcarriers selection is expressed as $$W_m = [w_m(0), w_m(1), \ldots, w_m(N_{ZC}-1)], m=0,1,\ldots,M. \quad (8)$$

where the vector element $w_m(n)$ ($n=0, 1, \ldots, N_{ZC}-1$) represents the $n^{th}$ converted signal element of the $m^{th}$ segment.

Further, the converted plurality of segments may be filtered in the frequency domain in block 420.

For example, the M vectors $W_m$ (m=0, 1, ... M) may be further processed with matched filters (MFs), whose filter coefficients are selected according to the root sequence with different cyclic shifts, i.e., the vector in equation (4) with different $N_{cs}$, to obtain M output vectors. The $m^{th}$ output vector with the root sequence with cyclic shift $N_{cs}$ is expressed as $$G_{m,N_{cs}} = [g_{m,N_{cs}}(0), g_{m,N_{cs}}(1) \quad \cdots \quad g_{m,N_{cs}}(N_{ZC}-1)], m=0,1,\ldots,M, \quad (9)$$

where $g_{m,N_{cs}}(n)$ ($n=0, 1, \ldots, N_{ZC}-1$) is the filtered value for the $m^{th}$ output vector representing the $n^{th}$ filtered signal element of the $m^{th}$ segment and calculated as $$g_{m,N_{cs}}(n) = v_{N_{cs}}(n)' \times w_m(n), n=0,1,\ldots,N_{ZC}-1, \quad (10)$$

where $(.)'$ is the conjunction function of a complex value.

Subsequently, the filtered plurality of segments may be converted back to the time domain in block 430.

For example, the $m^{th}$ output vector $G_{m,N_{cs}}$ in equation (9) may be processed by invert DFT directly without any coherent accumulation to obtain M output vectors in the time domain. The output vector for the $m^{th}$ segment in this step is expressed as $$Q_{m,N_{cs}} = IDFT(G_{m,N_{cs}}) = [q_{m,N_{cs}}(0), \quad \cdots \quad q_{m,N_{cs}}(N_{ZC}-1)], m=0,1,\ldots,M. \quad (11)$$

Then, the converted filtered plurality of segments may be non-coherently accumulated to an accumulated signal sequence in block 440. The non-coherent accumulation used herein may refer to the accumulation of energy for a same signal element from different segments without phase information being involved, as illustrated by the following equations (12) and (13), while the coherent accumulation used herein may refer to the accumulation of the same signal element from different segments with phase information being involved, as illustrated by the following equations (20) and (21).

For example, the output vectors obtained in equation (11) may be subject to the non-coherent accumulation to obtain a vector as $$Z_{N_{cs}} = [z_{N_{cs}}(0), \ldots, z_{N_{cs}}(N_{ZC}-1)], \quad (12)$$

where the vector element $z_{N_{cs}}(n)$ ($n=0, 1, \ldots N_{ZC}-1$) in equation (12) is the absolute square values of $Q_{m,N_{cs}}$ representing an energy level of the $n^{th}$ filtered signal element of the $m^{th}$ segment and expressed as $$z_{N_{cs}}(n) = \sum_{m=0}^{M-1} |q_{m,N_{cs}}(n)|^2, n=0,1,\ldots,N_{ZC}-1 \quad (13)$$

where $\Sigma$ denotes a summing operation and $|\bullet|^2$ denotes an operation for calculating an absolute square value.

The non-coherent accumulation of all M segments or M sectors is adopted herein to help avoiding the impact of a frequency offset of the received uplink signal.

Then, it is detected in block 450 whether there is a random access preamble based on a comparison of the accumulated signal sequence with a threshold determined from the high false alarm value.

For example, a noise level may be obtained by averaging the absolute square values of the vectors in equation (8) as $$\text{Noise} = \frac{1}{M \cdot N_{ZC}} \sum_{m=0}^{M-1} \sum_{n=0}^{N_{ZC}-1} |w_m(n)|^2, \quad (14)$$

Thus, the following vector may be used to detect the existence or non-existence of the root sequence with the cyclic shift of $N_{cs}$.

$$\tilde{Z}_{N_{CS}} = \frac{Z_{N_{CS}}}{\text{Noise}}, \quad (15)$$
$$n = 0, 1, \ldots, N_{ZC} - 1.$$

In this case, if the maximum value in $\tilde{Z}_{N_{cs}}$ is larger than a threshold, which is determined from the false alarm value, $P_{FA,2}$ that may be selected as a relatively high value, such as 20~30% to obtain as many possible access preambles with the frequency offset as possible, then a random access preamble generated from the root sequence with the cyclic shift $N_{cs}$ is detected. If the existence of a random access preamble is detected, then the flowchart 300 continues, and otherwise the preamble detection procedure ends.

Subsequently, in an embodiment, the frequency offset of the received uplink signal is determined in block 310, for example as a response to the detection of the random access preamble in block 302. Then the received uplink signal is adjusted with the determined frequency offset in block 320.

Figure 5:
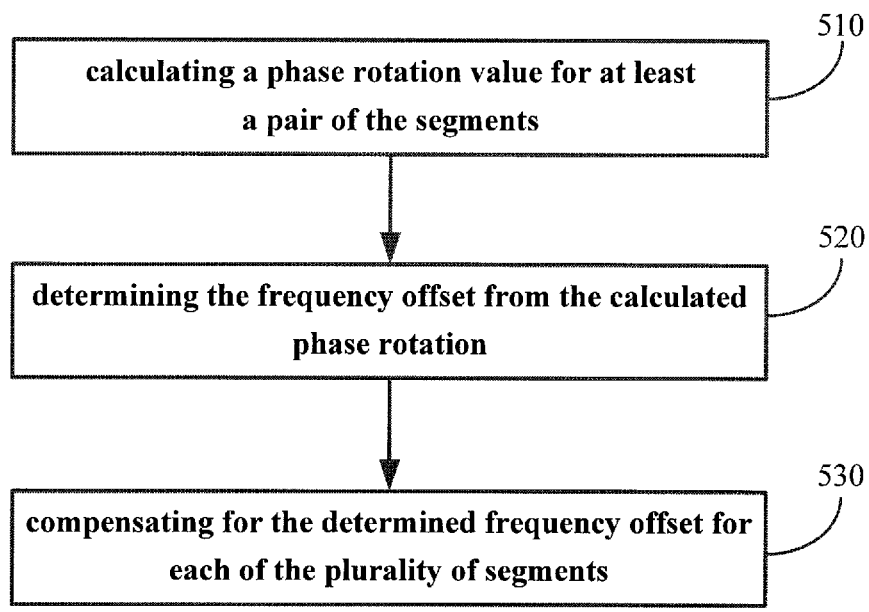
FIG. 5 illustrates an example procedure for implementing the frequency offset determination and the adjustment as illustrated in FIG. 3 according to an embodiment of the present disclosure.

FIG. 5 illustrates an example procedure for implementing the frequency offset determination and the adjustment according to an embodiment of the present disclosure.

As illustrated in block 510, a phase rotation of at least one pair of segments among the plurality of segments may be calculated.

For example, the signal vectors of equation (7) in the time domain may be used to obtain the phase rotations, which are calculated by averaging a phase difference between any two adjacent vectors as $$\varphi(m) = \frac{1}{N_{ZC}} \sum_{n=0}^{N_{ZC}-1} \arg(g_{m+1,Ncs}(n) g'_{m,Ncs}(n)), \quad (16)$$
$$m = 0, \ldots, M - 2,$$

wherein arg(.) denotes an operation for obtaining the phase angle of a complex value and (.)' is the conjunction function of a complex value.

It shall be appreciated that the phase rotations may also be calculated by averaging a phase difference between any two vectors with a certain distance inbetween as $$\varphi(m) = \frac{1}{N_{ZC}} \sum_{n=0}^{N_{ZC}-1} \arg(g_{m+p,Ncs}(n) g'_{m,Ncs}(n)), \quad (16')$$
$$m = \{0, \ldots, M - p - 1\}$$

where p denotes an integer larger than 1 and less than M.

Then, in block 520, the frequency offset of the received uplink signal may be obtained from the calculated phase rotations.

For example, the frequency offset of the received uplink signal may be calculated from the phase rotations calculated in equation (16) as $$\Delta \hat{f} = \frac{1}{M-1} \sum_{m=0}^{M-2} \frac{\varphi(m)}{2\pi N_{short} T_s}, \quad (17)$$

where $N_{short}$ is the number of samples in a duration of $T_{short}$.

Once the frequency offset is determined, the received uplink signal may be adjusted in block 530, for example by compensating for the determined frequency offset for each of the plurality of segments to obtain a plurality of offset-compensated segments.

For example, the $m^{th}$ vector for the $m^{th}$ segment after the frequency offset compensation may be expressed as $$\hat{Y}_m = [\hat{y}_m(0), \hat{y}_m(1) \ldots \hat{y}_m(N_{ZC}-1)], \quad (18)$$

where $\hat{y}_m(n)$ is obtained as $$\hat{y}_m(n) = y_m(n) e^{-j2\pi \Delta \hat{f}(mN_{short}+n)T_s}, \quad (19)$$

in which the determined frequency offset $\Delta \hat{f}$ is compensated for.

Now the flowchart proceeds to block 330 of FIG. 3, where the existence or non-existence of a random access preamble is more accurately detected from the adjusted uplink signal with a low false alarm value $P_{FA,1}$, corresponding to a first false alarm value in block 330.

Figure 6:
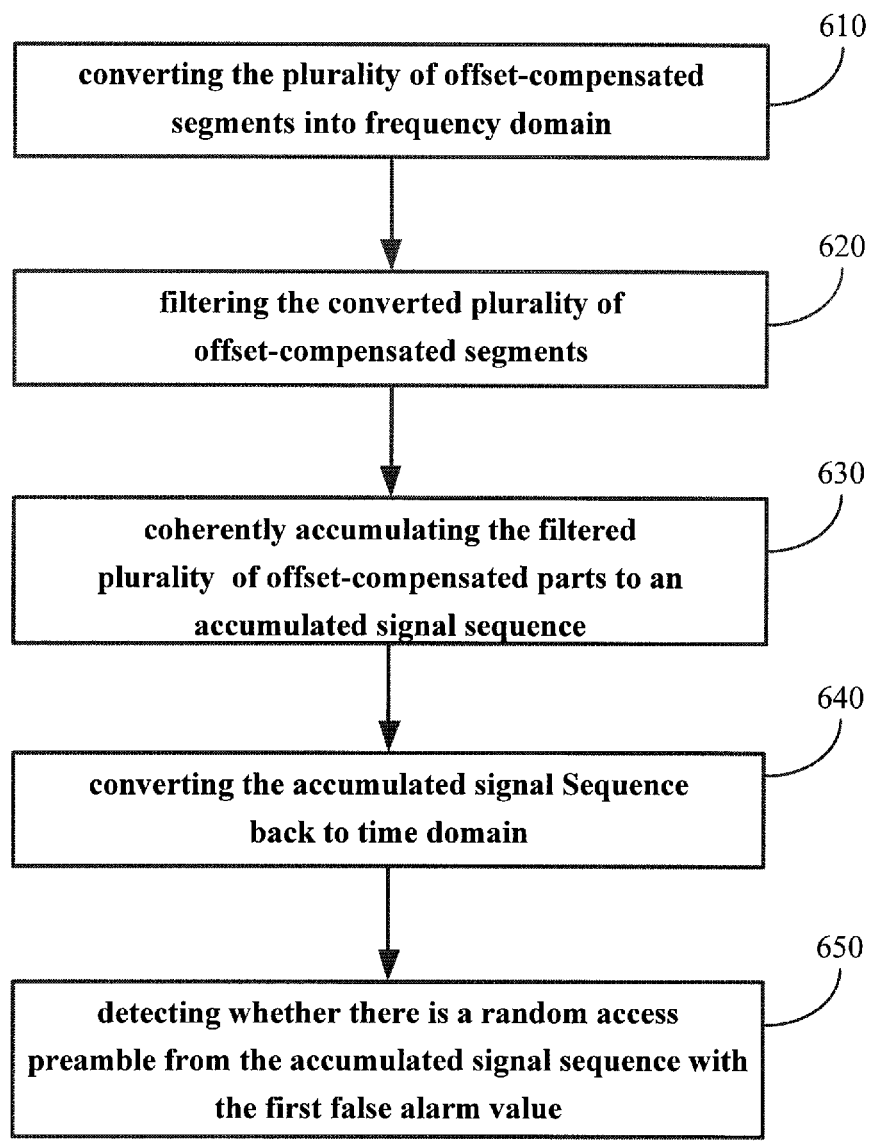
FIG. 6 illustrates an example procedure for implementing the random access preamble detection with the low false alarm value as illustrated in FIG. 3 according to an embodiment of the present disclosure.

FIG. 6 illustrates an example procedure for implementing this random access preamble detection with the low false alarm value $P_{FA,1}$. In this embodiment, the plurality of offset-compensated segments obtained in block 530 may be firstly converted from the time domain to the frequency domain, e.g. via FFT processing in block 610.

Then, the converted plurality of offset-compensated segments may be filtered in the frequency domain in block 620.

The operations performed in blocks 610 and 620 are similar to those as performed in blocks 410 and 420, for example by following equations (8)-(10). Therefore, detailed description of these operations will be omitted herein for simplicity purposes.

The difference between the procedures as illustrated in FIGS. 4 and 6 mainly lies in the signals to be subject to these procedures. In the procedure of FIG. 4, it is the received uplink signal with a frequency offset to be processed, while in the procedure of FIG. 6, it is the offset-compensated signal to be processed and thereby the coherent accumulation may be adopted.

Accordingly, the filtered plurality of offset-compensated segments may be coherently accumulated to obtain an accumulated signal sequence in block 630.

For example, the vector representing the accumulated signal sequence that comprises a plurality of, i.e. $N_{ZC}$, accumulated signal elements may be expressed as $$G_{Ncs} = [g_{Ncs}(0), g_{Ncs}(1) \ldots , g_{Ncs}(N_{ZC}-1)], \quad (20)$$

where the vector element $g_{Ncs}(n)$ ($n=0, 1, \ldots, N_{ZC}-1$) representing the $n^{th}$ accumulated signal element is calculated from the vector element in equation (10) as $$g_{Ncs}(n) = \Sigma_{m=0}^{M-1} g_{m,Ncs}(n), \, n=0,1,\ldots,N_{ZC}-1. \quad (21)$$

Then, the accumulated signal sequence may be converted back to the time domain, e.g. by inverse DFT (IDFT) processing in block 640.

For example, the vector representing the accumulated signal sequence may be processed by IDFT as $$Q_{Ncs} = \text{IDFT}(G_{Ncs}) = [q_{Ncs}(0), \ldots , q_{Ncs}(N_{ZC}-1)]. \quad (22)$$

Subsequently, whether there is a random access preamble may be detected in block 650 from the converted accumulated signal sequence with the low false alarm value $P_{FA,1}$.

In an embodiment, an energy level for each of the plurality of accumulated segments may be firstly obtained. For example, absolute square values for respective elements of the vector in equation (22) may be calculated as the energy level for corresponding accumulated signal elements, which is expressed as $$Z_{N_{cs}}=[z_{N_{cs}}(0), \ldots, z_{N_{cs}}(N_{ZC}-1)], \quad (23)$$

where the vector element $z_{N_{cs}}(n)$ (n=0, 1 ... $N_{ZC}$−1) is obtained as $$z_{N_{cs}}(n)=|q_{N_{cs}}(n)|^2. \quad (24)$$

Then a ratio of the energy level over a noise level of the received uplink signal may be calculated. For example, the ratio may be calculated as $$\tilde{Z}_{N_{cs}}=Z_{N_{cs}}/\text{Noise}, \quad (25)$$

where the noise level "Noise" may be calculated from equation (14).

At last, the random access preamble may be detected based on a comparison of the ratio with a threshold determined from the low false alarm value.

In the example as described by referring to equations (23)-(25), if the maximum value in $\tilde{Z}_{N_{cs}}$ is larger than a threshold, which is determined from the low false alarm value, $P_{FA,1}$ that may be selected as a relatively low value, such as 0.1% to obtain the more accurate access preamble detection, then a random access preamble generated from the root sequence with the cyclic shift $N_{cs}$ is detected. Furthermore, the propagation delay may also be obtained by identifying the index with the maximum value in the vector (25).

According to the method as proposed according to the above embodiments of the present disclosure with reference to FIGS. 3-6, the frequency offset in the radio system working on a high carrier frequency can be resisted, and further the existing hardware, e.g. FFT modules may be reused at the receiver of the base station. Also, since the effect of the frequency offset can be alleviated or eliminated, the random access failure rate may be decreased in the case of a high frequency offset; hardware requirements, such as on LO, in both base stations and user terminals can be relaxed in some degree; and the system performance, such as coverage, may be improved for initial access and handover.

The method 300 comprising the above described operations in blocks 301 and/or 302 belongs to a preferred embodiment, which may help increasing the preamble detection success rate and reducing the processing complexity of the receiver at the base station. Those skilled in the art, however, will appreciate that the two operations may be omitted or combined in some implementations according to practical application and performance requirements. Besides, the method 300 according to various embodiments of the present disclosure is illustrated and described in an order as shown in FIG. 3-6, however those skilled in the art shall appreciate that some operations of the method 300 may be performed in parallel or in a reverse order.

Furthermore, those skilled in the art shall appreciate that the method described above according to the embodiments of the present disclosure is not limited to detecting the random access preambles generated by repeating a short sequence a number of times, but rather can be more generally applicable to any random access preamble having a repeating characteristics.

Figure 7:
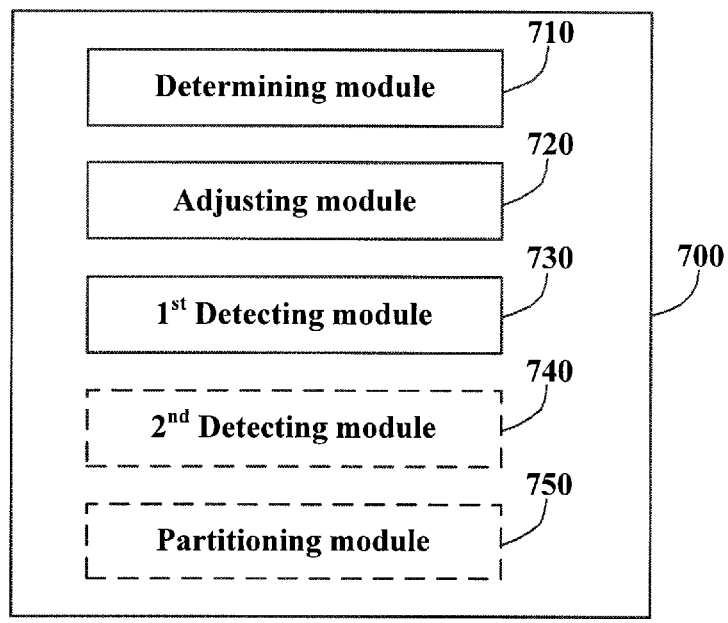
FIG. 7 illustrates a schematic block diagram of an apparatus in a base station adapted for random access preamble detection according to embodiments of the present disclosure.

FIG. 7 illustrates a schematic block diagram of an apparatus 700 in a base station adapted for random access preamble detection according to embodiments of the present disclosure. The apparatus 700 is configured to perform the method as described above with reference to FIGS. 3-6.

Particularly, as illustrated in FIG. 7, the apparatus 700 comprises a determining module 710 configured to determine a frequency offset of a received uplink signal, an adjusting module 720 configured to adjust the received uplink signal with the determined frequency offset, and a first detecting module 730 configured to detect, from the adjusted uplink signal, whether there is a random access preamble with a first false alarm value.

In an embodiment, the apparatus 700 may also comprise a second detecting module 740 configured to detect, from the received uplink signal, whether there is a random access preamble with a second false alarm value, before the determining module 710 determines the frequency offset of the received uplink signal. In this embodiment, the determining module 710 may determine the frequency offset of the received uplink signal in response that a random access preamble is detected by the second detecting module 740 with the second false alarm value. The second false alarm value may be higher than the first false alarm value.

By using two levels of false alarm values, the detection success rate and receiving sensitivity may be further increased. Furthermore, since the frequency offset determination, the uplink signal adjustment and the fine preamble detection with the lower first false alarm value are all performed after the coarse preamble detection with the higher second false alarm value, if no preamble is coarsely detected, these operations may not be performed, which may additionally reduce the processing complexity and power consumption at the base station receiver.

In a further embodiment, the random access preamble may comprise at least a sequence of a plurality of identical random access sequences. The apparatus 700 may further comprise a partitioning module 750 configured to partition the received uplink signal into a plurality of segments each having time duration equal to the time duration of the random access sequence, before the determining module 710 determines the frequency offset of the received uplink signal.

Additionally, the determining module 710 may further be configured to calculate a phase rotation for at least one pair of segments among the plurality of segments and determine the frequency offset from the calculated phase rotation.

In a further embodiment, the adjusting module 720 may further be configured to compensate for the determined frequency offset for each of the plurality of segments to obtain a plurality of offset-compensated segments.

In a further embodiment, the first detecting module 730 may further be configured to convert the plurality of offset-compensated segments into frequency domain; filter the converted plurality of offset-compensated segments in the frequency domain; coherently accumulate the filtered plurality of offset-compensated segments to an accumulated signal sequence; convert the accumulated signal sequence back to time domain; and detect whether there is a random access preamble from the converted accumulated signal sequence with the first false alarm value.

In another embodiment, the partitioning module 750 may further be configured to partition the received uplink signal before the second detecting module 740 detects whether there is a random access preamble with the second false alarm value. In this embodiment, the second detecting module 740 may further be configured to convert the plurality of segments from time domain to frequency domain; filter the converted plurality of segments in the frequency domain; convert the filtered plurality of segments back to the time domain; non-coherently accumulate the converted filtered plurality of segments to an accumulated signal sequence; and detect whether there is a random access preamble based on a comparison of the accumulated signal sequence with a threshold determined from the second false alarm value.

The above modules 710-750 may be configured to implement the corresponding operations or steps as described with reference to FIGS. 3-6 and thus will not be detailed herein for simplicity purposes.

Figure 8:
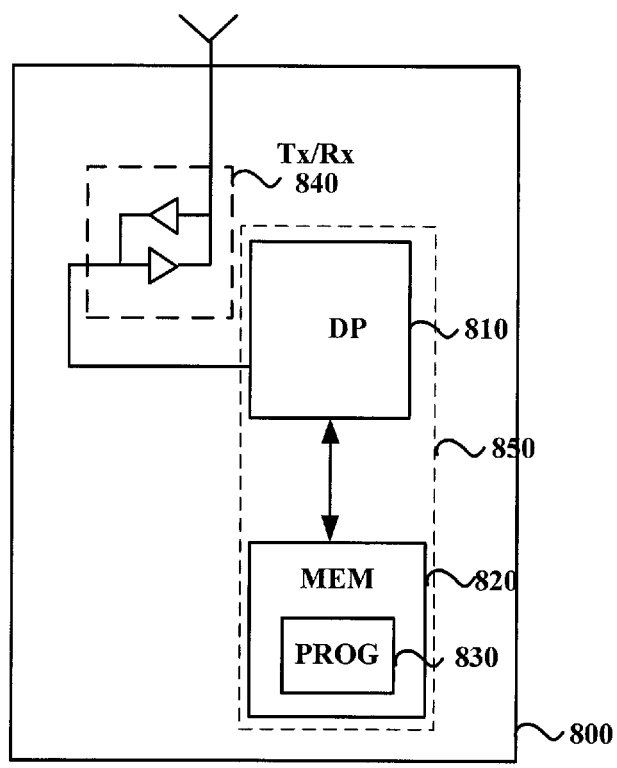
FIG. 8 illustrates a schematic block diagram of a base station in a radio access network according to embodiments of the present disclosure.

FIG. 8 illustrates a schematic block diagram of a base station 800 in a radio access network according to embodiments of the present disclosure.

The base station 800 comprises at least one processor 810, such as a data processor (DP) and at least one memory (MEM) 820 coupled to the processor 810. The base station 800 may further comprise a transmitter TX and receiver RX 840 coupled to the processor 810, which may be a RF TX/RX comprising at least one antenna for radio communications with other apparatuses, e.g. UEs. The MEM 820 stores a program (PROG) 830. The PROG 830 may include instructions that, when executed on the associated processor 810, enable the base station 800 to operate in accordance with the embodiments of the present disclosure, for example to perform the method 300. A combination of the at least one processor 810 and the at least one MEM 820 may form processing means 850 adapted to implement various embodiments of the present disclosure.

The processor 810 may be of any type suitable to the local technical environment, and may include one or more of general purpose computers, special purpose computers, microprocessors, digital signal processors DSPs and processors based on multicore processor architecture, as non-limiting examples.

The MEM 820 may be of any type suitable to the local technical environment and may be implemented using any suitable data storage technology, such as semiconductor based memory devices, magnetic memory devices and systems, optical memory devices and systems, fixed memory and removable memory, as non-limiting examples.

Although the above description is made in the context of radio access networks in LTE and higher systems, it should not be construed as limiting the spirit and scope of the present disclosure. The idea and concept of the present disclosure can be generalized to also cover other radio access networks.

In addition, the present disclosure provides a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods, apparatuses, e.g. base station. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method in a base station for random access preamble detection, comprising:
  partitioning a received uplink signal into a plurality of segments each having time duration equal to a time duration of a random access sequence;
  detecting from the received uplink signal whether there is a random access preamble;
  determining a frequency offset of the received uplink signal,
    wherein the random access preamble comprises at least a sequence of a plurality of identical random access sequences;
  adjusting the received uplink signal with the determined frequency offset; and
  detecting, from the adjusted uplink signal, whether there is a random access preamble with a first false alarm value.

2. The method of claim 1, further comprising:
detecting, from the received uplink signal, whether there is a random access preamble with a second false alarm value, before determining the frequency offset of the received uplink signal,
wherein determining the frequency offset of the received uplink signal is performed in response that a random access preamble is detected with the second false alarm value; and
the second false alarm value is higher than the first false alarm value.

3. The method of claim 1,
wherein determining the frequency offset of the received uplink signal comprises:
   calculating a phase rotation for at least one pair of segments among the plurality of segments; and
   determining the frequency offset from the calculated phase rotation.

4. The method of claim 3, wherein adjusting the received uplink signal with the determined frequency offset comprises:
compensating for the determined frequency offset for each of the plurality of segments to obtain a plurality of offset-compensated segments.

5. The method of claim 4, wherein detecting whether there is a random access preamble with the first false alarm value comprises:
converting the plurality of offset-compensated segments into frequency domain;
filtering the converted plurality of offset-compensated segments in the frequency domain;
coherently accumulating the filtered plurality of offset-compensated segments to an accumulated signal sequence;
converting the accumulated signal sequence back to time domain; and
detecting whether there is a random access preamble from the converted accumulated signal sequence with the first false alarm value.

6. The method of claim 5, wherein
the accumulated sequence comprises a plurality of accumulated signal elements; and
detecting whether there is a random access preamble from the converted accumulated signal sequence with the first false alarm value comprises:
obtaining an energy level for each of the plurality of accumulated signal elements;
calculating a ratio of the energy level over a noise level of the received uplink signal;
detecting the random access preamble based on a comparison of the ratio with a threshold determined from the first false alarm value.

7. The method of claim 6, wherein the coherently accumulated signal sequence is expressed as a vector $G_{N_{cs}}$ comprising a plurality of vector elements $g_{m,Ncs}(n)$ each representing a corresponding accumulated signal element of the coherently accumulated signal sequence:

$$G_{N_{cs}}=[g_{Ncs}(0), g_{Ncs}(1) \ldots, g_{Ncs}(N_{ZC}-1)], \text{ wherein}$$

$$g_{Ncs}(n)=\Sigma_{m=0}^{M-1} g_{m,Ncs}(n), n=0,1, \ldots N_{ZC}-1,$$

where $N_{ZC}$ denotes a number of the plurality of accumulated signal elements; M denotes a number of the plurality segments; m denotes an index of the plurality segments; and $g_{m,Ncs}(n)$ denotes the $m^{th}$ segment of the $n^{th}$ accumulated signal element with a cyclic shift being applied to the random access sequence.

8. The method of claim 3, wherein
partitioning the received uplink signal is performed before detecting whether there is a random access preamble with the second false alarm value; and
detecting whether there is a random access preamble with the second false alarm value comprises:
converting the plurality of segments from time domain to frequency domain;
filtering the converted plurality of segments in the frequency domain;
converting the filtered plurality of segments back to the time domain;
non-coherently accumulating the converted filtered plurality of segments to an accumulated signal sequence; and
detecting whether there is a random access preamble based on a comparison of the accumulated signal sequence with a threshold determined from the second false alarm value.

9. The method of claim 8, wherein the non-coherently accumulated signal sequence comprises a plurality of accumulated signal elements and is expressed as a vector $Z_{N_{cs}}$ comprising a plurality of vector elements $z_{N_{cs}}(n)$ each representing a corresponding accumulated signal element of the non-coherently accumulated signal sequence:

$$Z_{N_{cs}}=[Z_{N_{cs}}(0), \ldots, Z_{N_{cs}}(N_{ZC}-1)], \text{ wherein}$$

$$Z_{N_{cs}}(n)=\Sigma_{m=0}^{M-1}|q_{m,N_{cs}}(n)|^2, n=0, 1, \ldots N_{ZC}-1,$$

where $N_{ZC}$ denotes a number of the plurality of accumulated signal elements of the non-coherently accumulated signal sequence; M denotes a number of the plurality segments; m denotes an index of the plurality segments; and $q_{m,N_{cs}}(n)$ denotes the $m^{th}$ segment of the $n^{th}$ accumulated signal element of the non-coherently accumulated signal with a cyclic shift being applied to the random access sequence.

10. A base station in a radio access network, comprising:
a processor; and a memory, said memory containing instructions executable by said processor, whereby said base station is operative to:
partition a received uplink signal into a plurality of segments each having time duration equal to a time duration of a random access sequence;
detect, from the received uplink signal, whether there is a random access preamble;
determine a frequency offset of the received uplink signal,
wherein the random access preamble comprises at least a sequence of a plurality of identical random access sequences;
adjust the received uplink signal with the determined frequency offset; and
detect, from the adjusted uplink signal, whether there is a random access preamble with a first false alarm value.

11. The base station of claim 10, wherein the memory contains further instructions executable by the processor, whereby the base station is further operative to: detect, from the received uplink signal, whether there is a random access preamble with a second false alarm value, before determining the frequency offset of the received uplink signal,
wherein to determine the frequency offset of the received uplink signal is performed in response that a random access preamble is detected with the second false alarm value; and the second false alarm value is higher than the first false alarm value.

12. The base station of claim 10, wherein the memory contains instructions executable by the processor, whereby the base station is operative to:
   calculate a phase rotation for at least one pair of segments among the plurality of segments; and
   determine the frequency offset from the calculated phase rotation.

13. The base station of claim 12, wherein the memory contains instructions executable by the processor, whereby the base station is operative to:
   compensate for the determined frequency offset for each of the plurality of segments to obtain a plurality of offset-compensated segments.

14. The base station of claim 13, wherein the memory contains instructions executable by the processor, whereby the base station is operative to:
   convert the plurality of offset-compensated segments into frequency domain;
   filter the converted plurality of offset-compensated segments in the frequency domain;
   coherently accumulate the filtered plurality of offset-compensated segments to an accumulated signal sequence;
   convert the accumulated signal sequence back to time domain; and
   detect whether there is a random access preamble from the converted accumulated signal sequence with the first false alarm value.

15. The base station of claim 14, wherein the accumulated sequence comprises a plurality of accumulated signal elements; and the memory contains instructions executable by the processor, whereby the base station is operative to:
   obtain an energy level for each of the plurality of accumulated signal elements;
   calculate a ratio of the energy level over a noise level of the received uplink signal; and
   detect the random access preamble based on a comparison of the ratio with a threshold determined from the first false alarm value.

16. The base station of claim 15, wherein the coherently accumulated signal sequence is expressed as a vector $G_{N_{cs}}$ comprising a plurality of vector elements $g_{m,N_{cs}}(n)$ each representing a corresponding accumulated signal element of the coherently accumulated signal sequence:

$$G_{N_{cs}}=[g_{Ncs}(0), g_{Ncs}(1) \ldots, g_{Ncs}(N_{zc}-1)], \text{ wherein}$$

$$g_{Ncs}(n)=\Sigma_{m=0}^{M-1} g_{m,Ncs}(n), n=0,1, \ldots N_{zc}-1,$$

where $N_{zc}$ denotes a number of the plurality of accumulated signal elements; M denotes a number of the plurality segments; m denotes an index of the plurality of segments; and $g_{m,Ncs}(n)$ denotes the $m^{th}$ segment of the $n^{th}$ accumulated signal element with a cyclic shift being applied to the random access sequence.

17. The base station of claim 10, wherein to partition the received uplink signal is performed before detecting whether there is a random access preamble with the second false alarm value; and the memory contains instructions executable by the processor, whereby the base station is operative to:
   convert the plurality of segments from time domain to frequency domain;
   filter the converted plurality of segments in the frequency domain;
   convert the filtered plurality of segments back to the time domain;
   non-coherently accumulate the converted filtered plurality of segments to an accumulated signal sequence; and
   detect whether there is a random access preamble based on a comparison of the accumulated signal sequence with a threshold determined from the second false alarm value.

18. The base station of claim 17, wherein the non-coherently accumulated signal sequence comprises a plurality of accumulated signal elements and is expressed as a vector $Z_{N_{cs}}$ comprising a plurality of vector elements $z_{N_{cs}}(n)$ each representing a corresponding accumulated signal element of the non-coherently accumulated signal sequence:

$$Z_{N_{cs}}=[Z_{N_{cs}}(0), \ldots, Z_{N}cs(N_{zc}-1)], \text{ wherein}$$

$$z_{N_{cs}}(n)=\Sigma_{m=0}^{M-1}|q_{m,N_{cs}}(n)|^2, n=0,1, \ldots N_{ZC}-1,$$

where $N_{zc}$ denotes a number of the plurality of accumulated signal elements of the non-coherently accumulated signal sequence; M denotes a number of the plurality segments; m denotes an index of the plurality segments; and $q_{m,N_{cs}}(n)$ denotes the $m^{th}$ segment of the $n^{th}$ accumulated signal element of the non-coherently accumulated signal with a cyclic shift being applied to the random access sequence.

19. The method of claim 10, wherein the random access sequence is defined by means of a Zadoff-Chu sequence, where $u^{th}$ root Zadoff-Chu sequence is defined as $$x_u(n) = e^{-j\frac{\pi u n(n+1)}{N_{ZC}}},$$

$$n = 0, 1, \ldots N_{ZC} - 1$$

wherein u is an index of the root sequence; $N_{ZC}$ denotes a length of the Zadoff-Chu sequence, which is a prime number; and the random access sequence is defined by $$s_{short}(t) = \beta \sum_{k=0}^{N_{ZC}-1} \sum_{n=0}^{N_{ZC}-1} x_u(n) \cdot e^{-j\frac{2\pi nk}{N_{ZC}}} \cdot e^{j2\pi(k+k_0)\Delta f t},$$

wherein $0 \leq t < T_{short}$, $T_{short}$ being the time duration of the random access sequence; $\beta$ is an amplitude-scaling factor, $K_0=n_{PRB}^{RA} N_{sc}^{RB} - N_{RB}^{UL} N_{sc}^{RB}/2$, and $\Delta f$ is subcarrier spacing, where a location of the resource block used for the random access preamble in the frequency domain is controlled by a parameter $n_{PRB}^{RA}$; a size of the resource block in the frequency domain, expressed as a number of subcarriers, is denoted by $N_{sc}^{RB}$, and an uplink bandwidth configuration, expressed in multiples of $N_{sc}^{RB}$, is denoted by $N_{RB}^{UL}$.

* * * * *